United States Patent
Bruder et al.

(10) Patent No.: US 6,901,130 B2
(45) Date of Patent: May 31, 2005

(54) RETROSPECTIVE AND/OR WINDOW-CONTROLLED FILTERING OF IMAGES FOR ADAPTING SHARPNESS AND NOISE IN COMPUTED TOMOGRAPHY

(75) Inventors: Herbert Bruder, Höchstadt (DE); Thomas Flohr, Ühlfeld (DE); Rainer Raupach, Adelsdorf (DE); Stefan Schaller, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 10/644,740

(22) Filed: Aug. 21, 2003

(65) Prior Publication Data

US 2004/0066912 A1 Apr. 8, 2004

(30) Foreign Application Priority Data

Aug. 21, 2002 (DE) .......................................... 102 38 322

(51) Int. Cl.⁷ ................................................. A61B 6/03
(52) U.S. Cl. ................................ 378/4; 378/8; 378/901
(58) Field of Search ............................ 378/4, 8, 15, 19, 378/901

(56) References Cited

U.S. PATENT DOCUMENTS

| | | | |
|---|---|---|---|
| 4,229,764 A | 10/1980 | Danos | |
| 4,456,926 A | * 6/1984 | Kruger et al. | 378/98.12 |
| 4,827,492 A | 5/1989 | Klauzs | |
| 4,979,136 A | * 12/1990 | Weiman et al. | 382/169 |
| 6,463,167 B1 | 10/2002 | Feldman et al. | |
| 6,801,646 B1 | * 10/2004 | Pena et al. | 382/131 |

OTHER PUBLICATIONS

Fang, S. et al. "Three–Dimensional Microscopy Data Exploration by Interactive Volume Visualization", Scanning, vol. 22, 2000, pp. 218–226.

Bildgebende systeme für die medizinische Diagnostik, 3. Auflage, München: Publicis MCD Verlag, 1995, Hrsg.: Morneburg, Heinz.

* cited by examiner

*Primary Examiner*—David V Bruce
(74) *Attorney, Agent, or Firm*—Harness, Dickey & Pierce P.L.C.

(57) ABSTRACT

A method is for window-controlled filtering of CT images. A CT raw data record is acquired, for example, with the aid of a CT unit or of a C-arc unit. A primary data record is then reconstructed from the CT raw data record by way of, for example, a sharp convolution core and, for example, a narrow slice sensitivity profile. A transfer function is then provided as functional relationship between window width and image sharpness. The image sharpness of the CT image of a selected slice is then automatically calculated, situated in the primary data record, as a function of a selected window width for the selected slice by way of an image processing procedure on the basis of the transfer function.

45 Claims, 4 Drawing Sheets

RETROSPECTIVE AND/OR WINDOW-CONTROLLED FILTERING OF IMAGES FOR ADAPTING SHARPNESS AND NOISE IN COMPUTED TOMOGRAPHY

The present application hereby claims priority under 35 U.S.C. §119 on German patent application number DE 10238322.7 filed Aug. 21, 2002, the entire contents of which are hereby incorporated herein by reference.

BACKGROUND OF THE INVENTION

Image data of a measurement object to be examined can be obtained with the aid of modern medical diagnostic methods such as, for example, X-ray computed tomography (CT). As a rule, the measurement object examined is a patient.

X-ray computed tomography—noted below by CT for short—is a specific X-ray recording method that differs fundamentally in image structure from the classical X-ray tomography method. What is obtained in the case of CT photographs are transverse sectional images, that is to say images of body slices that are aligned substantially perpendicular to the body axis. The tissue-specific physical quantity represented in the image is the distribution of the attenuation value of X-ray radiation $\mu(x, y)$ in the sectional plane. The CT image is obtained by reconstructing the one-dimensional projections, supplied by the measurement system used, of the two-dimensional distribution of $\mu(x, y)$ from numerous different angles of view.

CT images can be generated both by way of a CT unit with a scanning system that can circulate endlessly, and by way of a C-arc unit with a scanning system that can rotate only by less than 360°. The abbreviation "CT", for example in "CT raw data", is used below with reference to both types of unit.

The projection data are determined from the intensity I of an X-ray after its path through the slice to be imaged, and by its original intensity $I_0$ at the X-ray source in accordance with the absorption law $$\ln\frac{I_0}{I} = \int_L \mu(x, y) dl \quad (1)$$

The integration path L represents the track of the X-ray considered through the two-dimensional attenuation distribution $\mu(x, y)$. An image projection is then compiled from the measured values, obtained with the aid of the X-rays from one direction of view, of the line integrals though the object slice.

The projections originating from the most varied directions—characterized by the projection angle $\alpha$—are obtained by a combined X-ray tube/detector system that rotates in the slice plane about the object. The units currently most employed are so-called "fan beam units" in the case of which tubes and an array of detectors (a linear arrangement of detectors) rotate together in the slice plane about a center of rotation, which is also the center of the circular measuring field. The "parallel beam units", which are affected by very long measuring times, will not be explained here. However, it may be pointed out that it is possible to convert from fan to parallel projections and vice versa. Thus, an embodiment of the present invention, which is to be explained with the aid of a fan beam unit, can also be applied without restriction to parallel beam units.

In fan beam geometry, a CT photograph includes line integral measured values $-\ln(I/I_0)$ of incident beams that are characterized by a two-dimensional coupling of the projection angle $\alpha \in [0, 2\pi)$ and the fan angles $\beta \in [-\beta_0, \beta_0]$ defining the detector positions ($\beta_0$ being half the fan opening angle). Since the measuring system has only a finite number k of detector elements, and a measurement consists of a finite number y of projections, this coupling is discrete and can be represented by a matrix:

$$\tilde{p}(\alpha_y, \beta_k):[0, 2\pi] \times [-\beta_0, \beta_0] \quad (2)$$

or $$\tilde{p}(y, k):(1, 2 \ldots N_P) \times (1, 2 \ldots N_S) \quad (3)$$

The matrix $\tilde{p}(y, k)$ is called a sinogram for fan beam geometry. The number of projections y and the number of channels k are of the order of magnitude of 1000.

Taking the logarithms in accordance with the equation (1) thus yields the line integrals of all the projections $$p(\alpha; \beta) = \ln\frac{I_0}{I} = \int_L \mu(x, y) dl, \quad (3a)$$

the totality of which is also denoted as radon transform of the distribution $\mu(x, y)$. Such a radon transformation is reversible. It is thereby being possible to calculate $\mu(x, y)$ from $p(\alpha, \beta)$ by back transformation (inverse radon transformation).

It is customary in this back transformation to apply a convolution algorithm in which the line integrals per projection are firstly convolved with the aid of a special function and then backprojected onto the image plane along the original beam directions. This special function, by which the convolution algorithm is essentially characterized, is denoted as "convolution core". Owing to the mathematical configuration of the convolution core, the possibility exists of specifically influencing the image quality in the reconstruction of a CT image from the CT raw data.

For example, an appropriate convolution core can be used to emphasize high frequencies in order to increase the spatial resolution in the image. Alternatively, a convolution core of an appropriately different type can be used to damp high frequencies in order to reduce the image noise. Thus, it may be stated in summary that when reconstructing images in computed tomography the image characteristic, which is characterized by image sharpness/image noise and image contrast (two behaving in a complementary fashion relative to one another), can be influenced by selecting a suitable convolution core. There is a direct proportionality between image sharpness and image noise in this case, that is to say when the image sharpness is increased the noise is increased to the same extent.

No further investigation is now to be made into the principle of image reconstruction in CT by calculating the $\mu$ value distribution. A detailed description of CT image reconstruction is to be found, for example, in "Bildgebende Systeme für die medizinische Diagnostik" ["Imaging systems for medical diagnostics"], 3rd Edition, Munich: Publicis MCD Verlag, 1995, Publisher: Morneburg Heinz, ISBN 3-89578-002-2, the entire contents of which are hereby incorporated herein by reference.

However, the task of image reconstruction is not yet concluded with the calculation of the $\mu$ value distribution of the transirradiated slice. The distribution of the attenuation coefficient $\mu$ represents in the field of medical application only an anatomical structure that still needs to be represented in the form of an X-ray image.

In line with a proposal from G. N. Hounsfield, it has become generally customary to convert the values of the linear attenuation coefficient $\mu$ (which has the unit of measurement cm$^{-1}$) to a dimensionless scale in which water takes the value 0 and air the value $-1000$. The conversion formula to this "CT number" is:

$$\text{CT-number} = \frac{\mu - \mu_{water}}{\mu_{water}} 1000 \quad (4)$$

The unit of the CT number is called the "Hounsfield unit" (HU). This scale, denoted as the "Hounsfield scale", is very well suited to representing anatomical tissue, since the unit HU expresses the deviation in parts per thousand from $\mu_{water}$, and the $\mu$ values of most bodily substances differ only slightly from the $\mu$ value of water. Only whole numbers are used from the number range (from $-1000$ for air up to approximately 3000) as carriers of image information.

However, the representation of the entire scale range of approximately 4000 values would far exceed the discrimination threshold of the human eye. In addition, the viewer is frequently interested only in a small section of the attenuation value range, for example the differentiation of gray and white brain substance, which differ only by about 10 HU.

Use is made of so-called image windowing for this reason. Only part of the CT value scale is selected in this case, and is spread over all available gray levels. Even small attenuation differences within the chosen window thus become perceptible gray tone differences, and all the CT values below the window are represented black and all the CT values above the window white. The image window can be varied arbitrarily both in terms of its central level and in terms of its width.

It is of interest in computed tomography to undertake multiplanar reformattings (MPR or secondary sections). Multiplanar reformattings are arbitrarily inclined, flat CT images calculated from a volumetric data record (also denoted as primary data record and usually represented by thin axial layers). Since the pixels generally do not occupy the position defined in the volumetric data record, and the layer thickness of an MPR is intended to be able to be set arbitrarily, it is necessary in this case to interpolate suitably. Particularly in the case of more recent CT units, the resolution of a volumetric data record is virtually isotropic. For this reason, it is possible to calculate from such a volumetric data record high-quality MPRs whose quality does not differ from that of the primary images.

However, it is likewise of interest during the course of a good diagnostic image evaluation to manipulate the image characteristic of an MPR—essentially characterized by sharpness and noise—by use of suitable filters. Sharpness and noise of the reformattings are substantially determined by sharpness and noise of the primary, axial images as well as by the layer thickness set when generating the MPR.

The representation of CT images, in particular those of MPRs, with a different image characteristic is therefore of interest because a different evaluation (that is to say a different clinical assessment) of the same photograph of the corresponding tissue requires a different sort of representation of the recorded tissue.

In the prior art, a targeted manipulation of the image characteristic of secondary sections is achieved by determining from the raw data a new volumetric data record by way of a new image reconstruction with the aid of changed convolution core parameters, and using this new primary data record to subsequently regenerate the original secondary sections. This refers to a reconstruction with the aid of a different convolution core that has a different characteristic, for example precisely a different sharpness.

SUMMARY OF THE INVENTION

The above-described goal of adapting the image characteristic of CT images, in particular of secondary sections, optimally in accordance with the diagnostic requirements, can be realized only partly by way of this known mode of procedure. A renewed first reconstruction with the aid of the parameters adapted to the later use changes the sharpness only transverse to the patient's axis. The patient's axis is denoted below as the z-axis. In an MPR generated from this reconstruction, the image characterizing properties remain unchanged in the z-direction.

In order also to achieve the desired success in the z-direction, the slice sensitivity profiles (SSPs) of this first reconstruction would have to be individually adapted. To date, this adaptation has been possible only in discrete steps, that is to say a function for arbitrarily accurate tuning of the SSPs—which in principle can also be denoted as axial sharpness—is not provided in current CT units. Even if an arbitrary SSP could be used in the first reconstruction, the generation of suitably changed secondary sections would require a substantial outlay on operational and computer time.

It is therefore an object of an embodiment of the present invention to propose, with regard to diagnostically optimized points of view, new techniques for improving and/or simplifying the filtering of CT images.

Thus, an embodiment of the invention proposes a first inventive method for filtering CT images, having the following steps:

a) acquiring a CT raw data record with the aid of a CT unit or of a C-arm unit, b) reconstructing a primary data record from the CT raw data record by means of, for example, a sharp convolution core and, for example, a narrow slice sensitivity profile, c) providing a transfer function as functional relationship between window width and image sharpness, and d) automatically calculating the image sharpness of the CT image of a selected slice, situated in the primary data record, as a function of a selected window width for the selected slice by means of an image processing procedure on the basis of the transfer function.

In this case, in accordance with a first embodiment of this first inventive method, in the image processing procedure the window width is coupled to at least one parameter of the three-dimensional convolution core with the aid of which the primary data record is reconvolved, and the at least one slice is modified with regard to the image sharpness.

In accordance with a second exemplary embodiment of the first inventive method, in the image processing procedure the window width is coupled to at least one parameter of a two-dimensional convolution core with the aid of which the at least one slice is convolved and modified with regard to the image sharpness.

In both exemplary embodiments, a renewed reconstruction with changed core parameters, and the renewed calculation of secondary sections are avoided. As such, this constitutes a substantially quicker method.

It is advantageous initially that the primary data record is reconstructed with the aid of a convolution core of maximum sharpness and a slice sensitivity profile of maximum narrowness.

According to an embodiment of the invention, the slice can be an axial slice or else a secondary slice.

The selection of the window width is performed in this case by the user by means of a mouse or keyboard.

Furthermore, it can be advantageous when the transfer function additionally constitutes a functional relationship between window width and slice sensitivity profile.

According to an embodiment of the invention, a second inventive method is further proposed for filtering CT images, having the following steps:

(1) acquiring a CT raw record with the aid of a CT unit or of a C-arm unit, (2) reconstructing a primary data record with, for example, a sharp convolution core and, for example, a narrow slice sensitivity profile, (3) reconstructing an image stack with the aid of a corresponding image characteristic on the basis of the primary data record, (4) calculating a changed image characteristic of the image stack by means of an image processing procedure running in the background on the image computer, and (5) visualizing the image stack in the form of CT images with the aid of the changed image characteristic.

In a, once again, first exemplary embodiment of this second method according to the invention, via an input interface, the user can vary at least one parameter of the three-dimensional primary data convolution core, which is then used to re-convolve the primary data record in the image processing procedure. From this, a new image stack is determined that is modified with regard to image sharpness.

In a second exemplary embodiment of the second method according to the invention, via an input interface, the user can vary at least one parameter of a two-dimensional convolution core. This is then used in the image processing procedure for the individual convolution of individual slices of the image stack, and to modify them with regard to their image sharpness.

Steps (4) and (5) can be repeated by the user until a satisfactory image characteristic is achieved.

According to an embodiment of the invention, the image stack can constitute a stack of axial images or else a stack of arbitrary secondary sections.

A further aspect of an embodiment of the present invention is that the slice thickness of a slice contained in the image stack can be varied in the event of an unsatisfactory image characteristic.

Furthermore, there is proposed, according to an embodiment of the invention, a computed tomography unit for carrying out the method which has a computer that carries out the individual steps of the CT image processing.

Likewise, there is proposed, according to an embodiment of the invention, a computer software product that implements a method when it runs on a computing device connected to a computed tomography unit.

BRIEF DESCRIPTION OF THE DRAWINGS

Further features, properties and advantages of the present invention will now be explained with the aid of exemplary embodiments and with reference to the accompanying figures of the drawings, in which.

DETAILED DESCRIPTION OF THE PREFERRED EMBODIMENTS

Figure 1:
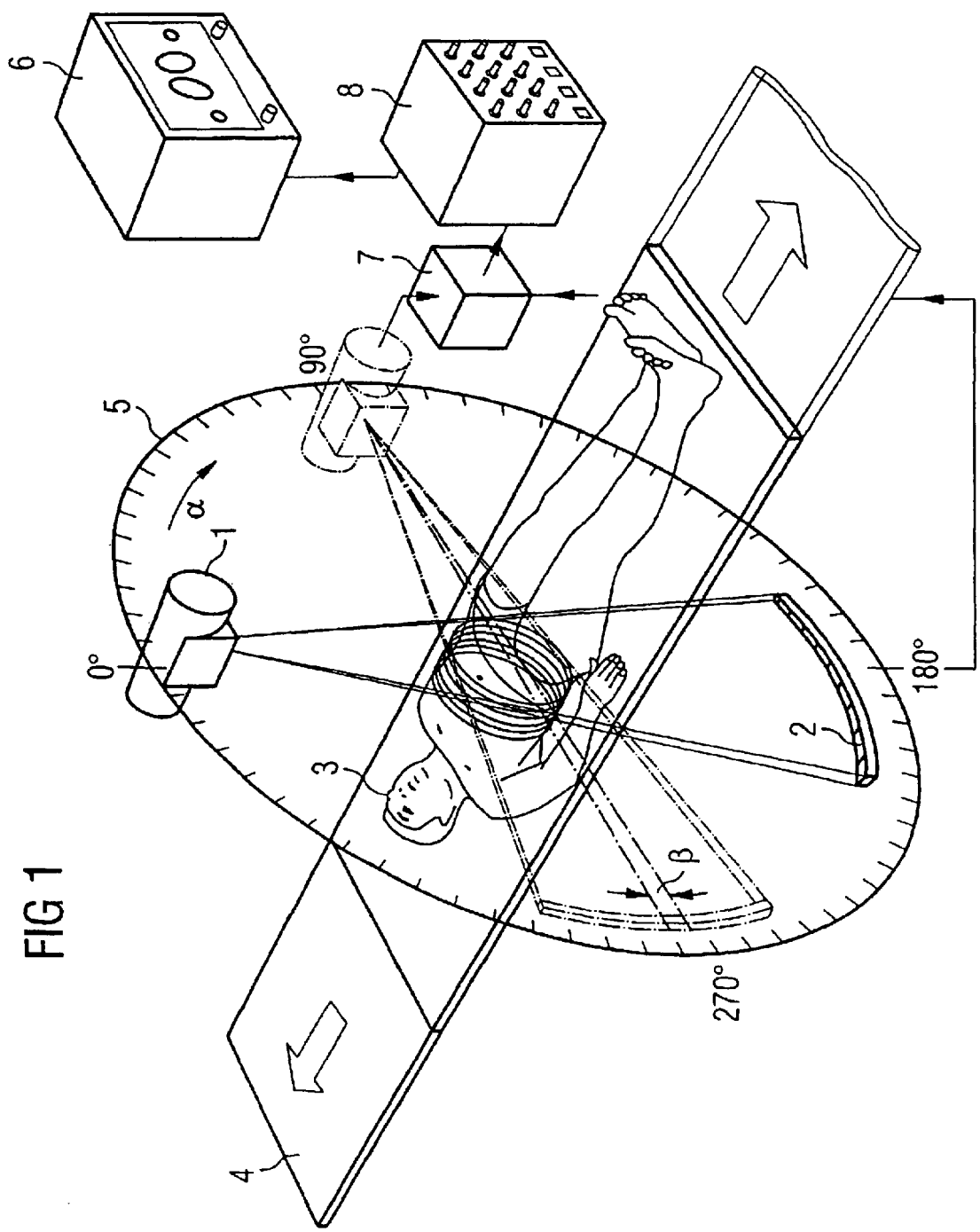
FIG. 1 shows a schematic of a CT apparatus for a fan beam method in accordance with an embodiment of the present invention.

Illustrated in FIG. 1, schematically, is a computed tomography unit for a fan beam method that operates in accordance with an embodiment of the present invention. In this device, X-ray tubes 1 and radiation detectors 2 rotate jointly about a center of rotation that is also the center of the circular measuring field 5 and at which the patient 3 to be examined is located on a patient couch 4. Instead of the computed tomography unit, it will also be possible to use a C-arm unit. The patient couch can be displaced along the longitudinal body axis in order to be able to examine different parallel planes of the patient 3.

As may be seen from the drawing, CT photographs yield transverse sectional images, that is to say images of body slices that are oriented substantially perpendicular to the body axis. This method of representing slices constitutes the distribution of the attenuation value $\mu_z(x, y)$ itself (z is the position on the longitudinal body axis). Computed tomography (termed CT below) requires projections at very many angles α. In order to produce a tomogram, the radiation cone emitted by the X-ray tube 1 is masked out such that a plane beam fan results that cast one-dimensional central projections of the transirradiated slice.

In order to reconstruct exactly the distribution of the attenuation values $\mu_z(x, y)$, this beam fan should be perpendicular to the rotation axis. Furthermore, it should be so widely spread that it completely covers the targeted slice of the measurement object from any projection direction α. This beam fan penetrating the object is picked up by detectors that are arranged linearly on a circular segment. There are up to 1000 detectors in commercially available units. The individual detector reacts to the incident beams with electric signals whose amplitude is proportional to the intensity of these beams.

Each individual detector signal belonging to a projection α is picked up respectively by an electronic measuring system 7 and passed on to a computer 8. The computer 8 is used to process the measured data in a suitable way and firstly to visualize them in the form of a sinogram (in which the projection α is plotted as a function of the measured values of the corresponding channel β) in so-called Gordon units, but finally in the form of a natural X-ray image in Hounsfield units on a monitor 6.

An aim of an embodiment of the present invention is to provide simple and quick methods in order to be able to adapt the image characteristic of CT images—in particular of secondary sections—from diagnostic points of view.

A first exemplary embodiment of a first inventive method resides—by contrast with the above-described prior art—in undertaking direct filtering of the volumetric data record obtained from the raw data. The raw data are measured in a first step by way of detector elements 2 in the form of attenuation profiles of different projections. These in turn are measured in different neighboring slices along the body axis. The raw data are picked up by the electronic measuring system 7 and passed onto the computer 8, which calculates from this CT raw data record in a second step, a primary data record (volumetric data record) that constitutes, as such in the form of HU units, the basis for the calculation of axial or secondary sectional images. All further steps of the method according to an embodiment of the invention are carried out in a purely computational fashion in the computer 8 of the CT unit and/or visualized on the monitor 6.

Thus, the inventive filtering of the primary data record is performed retrospectively in the first exemplary embodiment of the first inventive method by way of a three-dimensional convolution by applying a three-dimensional convolution core in the form of a three-dimensional matrix directly to the volumetric data record. The volumetric data record is thus changed in such a way that the secondary sections produced therefrom have the desired image characteristic.

The frequency response of the axial primary images in the transverse direction (that is to say in the x/y direction) is determined by the modulation transfer function of the reconstruction algorithm used and is generally isotropic. The modulation transfer function indicates which (spatial) frequency is visible in the image with which amplitude. The modulation transfer function is dependent essentially on the geometry of the X-ray system (focal length, number of the detector channels in the transverse direction, number of the projections per cycle etc.), and of the convolution core that is used in the reconstruction. The SSP, including measuring system components (focal length, width of the detector elements etc.) and algorithm components (axial weighting function in the spiral algorithm), defines in the z-direction the behavior in the frequency domain. As a rule, this direction is distinguished from the axial slice planes—even in the case of the 3D isotropic resolution.

A three-dimensional convolution core with the desired effect on the image characteristic can be radially symmetric with reference to the z-axis, while the z-axis assumes a special role. In general, the filter characteristic differs, however, along all three space axes.

Figure 5:
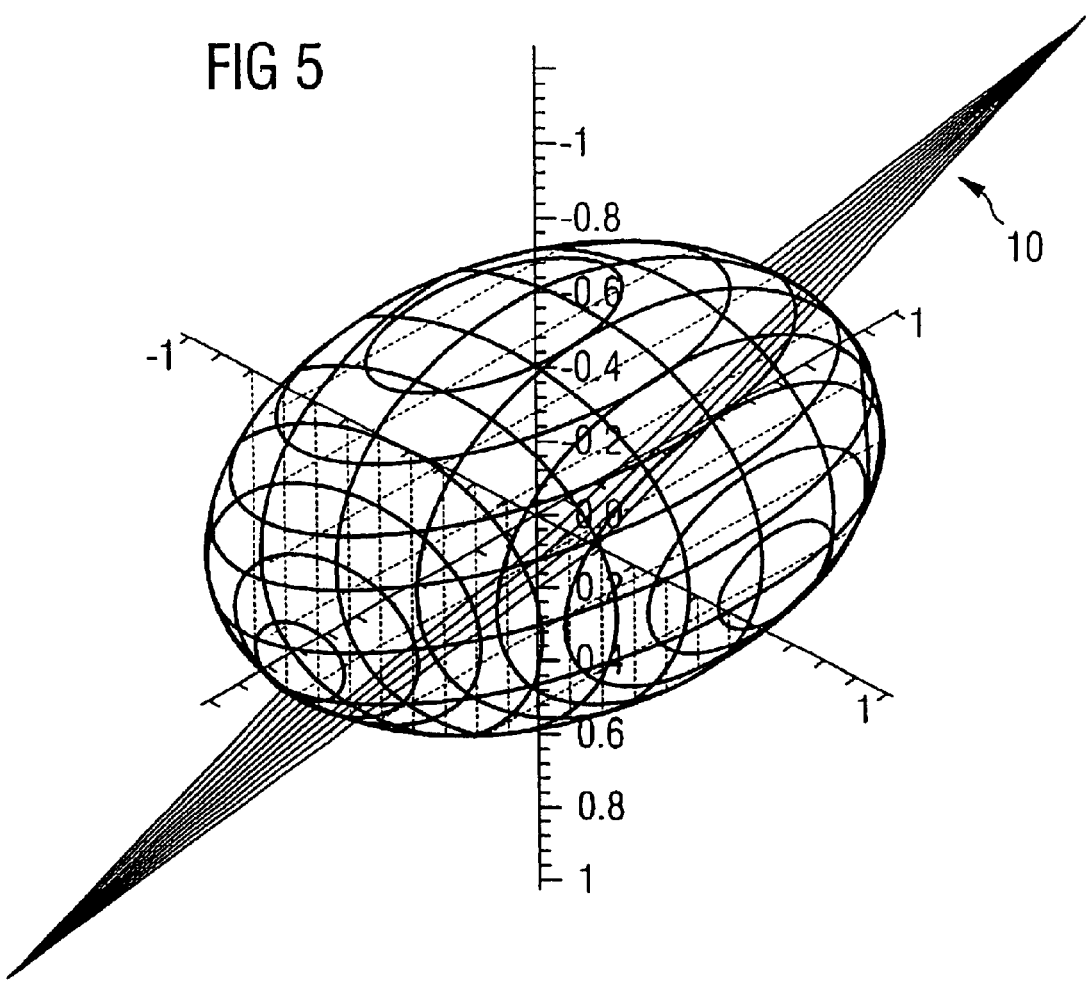
FIG. 5 shows the equipotential surface of a 3D convolution core in the form of an ellipsoid that is cut by a characteristic plane.

It may be assumed for the purpose of illustration that the 3D convolution core corresponding to the filtering is a Gaussian function, the width thereof along all the axes generally being different. The equipotential surface of such a convolution core is then the surface of an ellipsoid with different semi-axes, as is illustrated in FIG. 5, by way of example. Such an ellipsoid is used to determine the volumetric data record on the basis of which the secondary sections (MPRs) are then interpolated.

Figure 6:
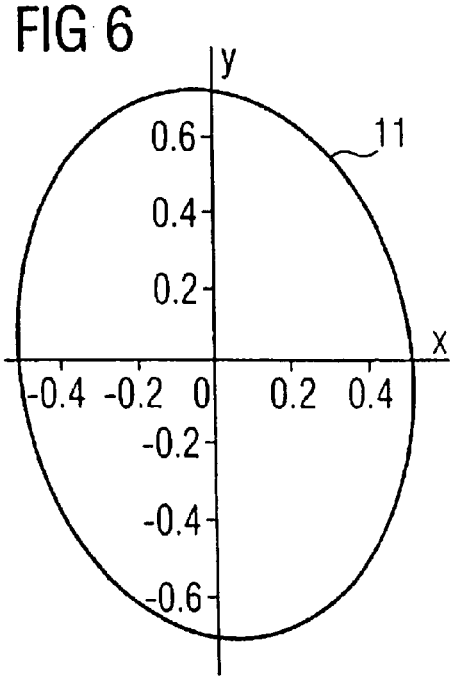
FIG. 6 shows, in the form of an ellipse, the equipotential line given by the characteristic plane.

A second exemplary embodiment of the first inventive method resides in directly filtering the secondary sections (MPRs). The usual procedure in this case is to undertake a two-dimensional convolution on the basis of the previously set slice thickness, as well as the spatial position of a secondary section. The two-dimensional convolution core required for this purpose is a two-dimensional matrix that is provided by the intersection of the 3D convolution core with the characteristic plane of the corresponding secondary section. The characteristic plane is uniquely fixed by a plane, parallel to the secondary sections, through the origin, and defines the position of the secondary sections. In general, the result for the equipotential lines of the two-dimensional convolution core is ellipses with axes that are rotated in general with reference to the Cartesian geometry. Such an ellipse is illustrated in FIG. 6.

Basically, both exemplary embodiments—3D convolution of the volumetric data record and subsequent calculation of the MPRs (3D filter+MPR) and calculation of the MPRs and their subsequent filtering with the aid of a 2D convolution core (MPR+2D filter)—are equivalent, to the extent that the properties perpendicular to the MPR plane are determined by the algorithm for calculating the secondary sections. Thus, for example, the slice thickness is set by the user during the calculation of an MPR with the aid of an interpolation function. Particularly in the case of two-dimensional filtering, the aim is also to change only the transverse characteristics of the MPRs.

The second exemplary embodiment, in particular, of the first inventive method (two-dimensional convolution core applied to MPRs already present) permits the image characteristic (sharpness, noise) of already present MPRs to be changed in a single step. In the case of typical computing times of approximately 100 msec per MPR, this method is substantially faster than the conventional method, in which a renewed reconstruction of the primary data record and a subsequent renewed calculation of the secondary sections are carried out from the raw data. On the basis of a stack of 100 primary images, from which 50 secondary sections have been calculated, the conventional method requires 50 seconds purely for the reconstruction, assuming two reconstructed primary images per second. In addition, there is also the production of the secondary sections. Direct filtering in accordance with the second exemplary embodiment of the first method of the present invention requires, by contrast, only about 5 seconds.

The exemplary embodiment of the first inventive method in the form of the 3D convolution is not quite so fast as the direct convolution of the already calculated secondary sections, since the volumetric data record is predetermined with the aid of a 3D convolution core before a renewed calculation of secondary sections, and this is more time consuming than a pure convolution of existing MPRs. The advantage of such a mode of procedure consists, however, in that arbitrary secondary sections that, in the final analysis, have the desired image characteristic can be laid in retrospect through the newly calculated volume.

A further aspect of the present invention is to provide the user in a second inventive method with a possibility of being able to adapt the image characteristic of a CT image (in particular an MPR) to a diagnostic requirement in a simple and quick way by use of a suitable visual interface which is ultimately to be implemented in the computer 8. Specifically, it is thus possible to represent different anatomical tissue types with a different image characteristic (image sharpness and image noise).

The second inventive method of an embodiment of the present invention capitalizes on the fact that the CT values (HU values) occupy different ranges in the Hounsfield scale depending on the organic structure.

Figure 2:
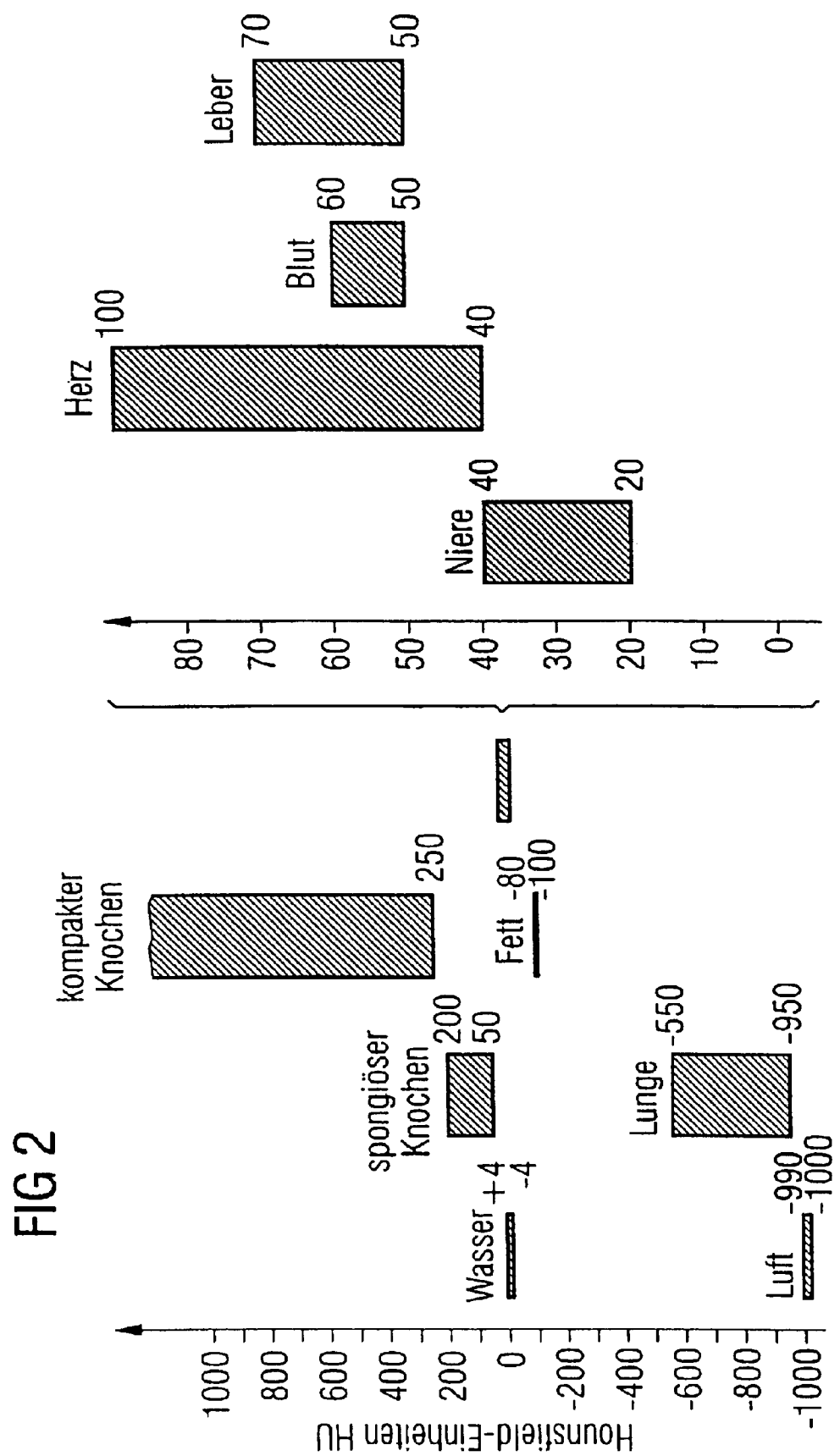
FIG. 2 shows a Hounsfield scale in which the Hounsfield units (HE) of different organs of the human body are specified.

The Hounsfield scale is illustrated in FIG. 2. The CT values of the individual organs assume specific ranges largely independently of the X-ray spectrum used. Thus, because of their low density and the low attenuation caused thereby, lung tissue and fat exhibit negative CT values in the range from −950 to −550 and −100 to −80, respectively. Most other tissues are in the positive range (kidney: 20–40, heart: 40–100, blood: 50–70, liver: 50–70). Because of the high atomic number of calcium and thus the relatively high attenuation, bone tissue has CT values of up to 2000 HU.

Figure 3:
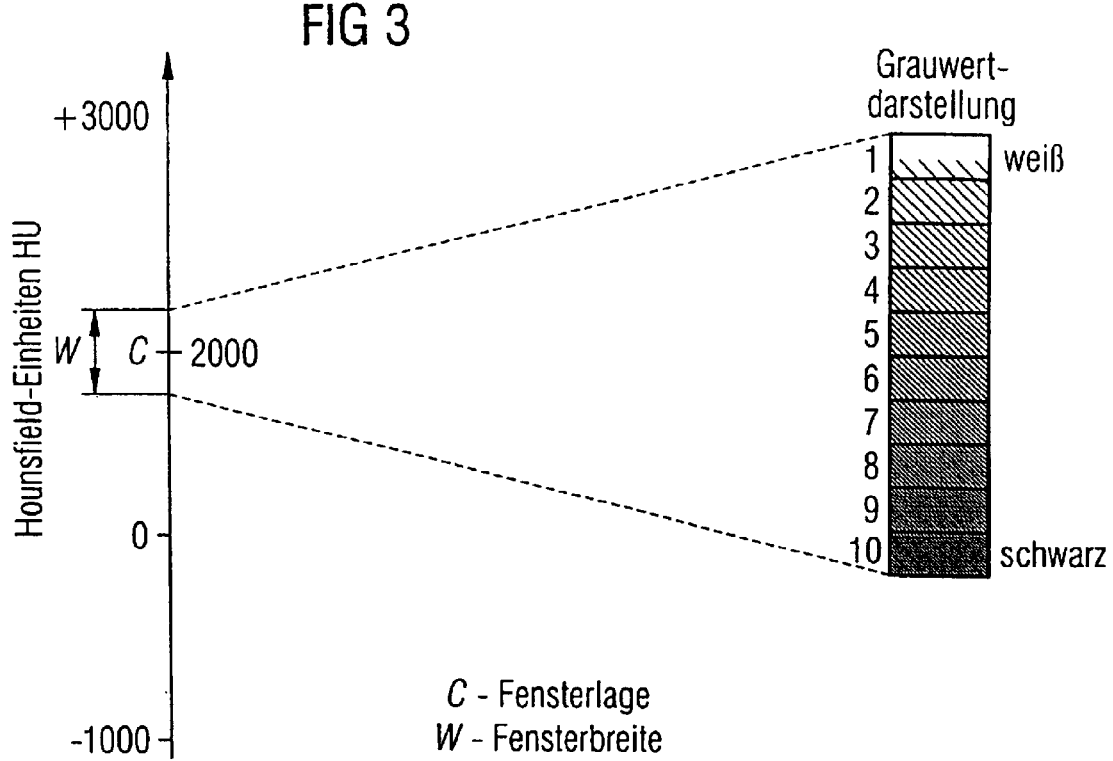
FIG. 3 shows windowing in the case of the representation of CT images.

4096 ($=2^{12}$) different gray scale values are available for conventional CT units for the purpose of representing the overall Hounsfield scale. However, the viewer can distinguish at most 60 to 80 gray levels. For this reason—as already mentioned—in CT imaging use is made of windowing in which an HU-interval of interest is assigned the entire gray scale. This is illustrated by way of example in FIG. 3 for the range of compact bone substance. The user interactively fixes the window in terms of center (window position C) and width (window width W), for example by means of mouse or rotary knob. In the example of FIG. 3, the center is at C=2000 and the window width is at W=400. The window is assigned 10 gray levels between white and black.

In general, the windowing is performed such that the organic structure of interest is optimally expressed. A classic application is a CT lung photograph (thorax), in the case of which both the contrasting bronchial branches and the low-contrast soft tissue of the lung have diagnostic relevance. In order to illustrate the bronchial branches, it is expedient to select a large window, the advantage thereby being that the noise is optically reduced, since the noise exhibits a maximum amplitude that is increasingly suppressed the larger the windowing. In order to resolve the fine structure of the tissue of the soft part, it is suitable to select a small window in which although the image sharpness is high a high noise amplitude associated therewith is also accepted at the same time, however.

Figure 4:
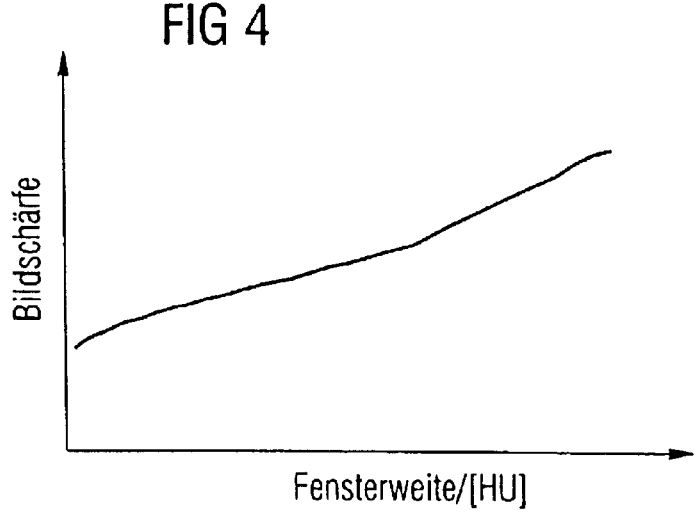
FIG. 4 shows an inventive transfer function.

It is sensible from a diagnostic point of view when the window width selected for representing the image fixes the sharpness parameters and thus the image characteristic. The inventive idea thus consists in coupling the window width selected for the image representation to image sharpness and noise. For this purpose, an embodiment of the invention defines a transfer function that uniquely assigns a convolution core to the selected window width. Such a transfer function is illustrated in FIG. 4. The abscissa represents the window width, and the ordinate the image sharpness. The transfer function is advantageously a monotonically rising curve, since with increasing window width for a given maximum noise amplitude the noise is suppressed more and more and the image contrast is increased. In general, however, it is possible to select between the window width and image sharpness an arbitrary relationship that expediently supports the diagnosis.

Owing to this functional relationship between window width and image sharpness, which is implemented, according to an embodiment of the invention, by software in the computer 8 of the CT unit, in accordance with a first exemplary embodiment of the second inventive method the user is able to change the image sharpness of the CT image of a selected slice present in the volumetric data record by filtering this basic volumetric data record in an image processing procedure based on the transfer function. As already described in detail above, it is possible in the general case for the filter characteristic (the nature of the convolution core on which the filtering is based) to differ along all three space axes. Clearly, the equipotential surfaces of the convolution core are then surfaces of ellipsoids with different semi-axes. Filtering the volumetric data record has the advantage that arbitrary slices can be obtained in retrospect in this volumetric data record with the correspondingly modified image characteristic.

For reasons of (computational) speed, however, in a second exemplary embodiment of the second inventive method direct filtering of the secondary sections is undertaken by using a two-dimensional convolution core. The spatial position of the secondary sections (MPRs) is uniquely fixed by a plane, parallel to the secondary sections, through the origin of coordinates (denoted below as "characteristic plane"). As already explained and illustrated in FIG. 6, the 2D convolution core used is given as a section of the 3D convolution core (ellipsoid) with the characteristic plane in the form of an ellipse.

The filtering according to the second exemplary embodiment of the second inventive method is implemented by carrying out a two-dimensional convolution on the corresponding secondary plane (MPR) of a prescribed reference volume. The reference volume is the primary data record (original volumetric data record) that was calculated from the raw data record, for example, with the aid of a convolution of maximum sharpness as well as a slice sensitivity profile of maximum narrowness.

In general, filtering of the above type according to the first exemplary embodiment of the second inventive method is carried out such that after prescription of the transfer function the three-dimensional filter characteristic is adapted as a function of the window width by means of an image processing procedure that is carried out on the computer 8. The reference volume is adapted with the aid of the corresponding three-dimensional convolution core to the desired image characteristic, and the corresponding secondary planes (MPRs) are subsequently calculated therefrom. Finally, the respective secondary plane is displayed with the aid of the selected window width.

The practical implementation of such window-controlled filtering of CT images is performed, for example, by virtue of the fact that the user changes the window width (window setting) in accordance with the diagnostic aims on the monitor 6 of the computer 8 at a virtual interface with the aid of the mouse, and correspondingly simultaneously varies the filter characteristic of the basic convolution core in accordance with the transfer function. Thus, it is possible solely by varying the window width to adapt the image characteristic (specifically, sharpness and noise) to the diagnostic requirements of the user.

Both inventive methods described are important not only for the adapted representation of secondary sectional images, but also in clinical practice, particularly for the diagnostic evaluation of axial slice images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for window-controlled filtering of CT images, comprising:
   reconstructing a primary data record from a CT raw data record;
   providing a transfer function as functional relationship between window width and image sharpness; and
   automatically calculating image sharpness of the CT image of at least one selected image slice, situated in the primary data record, as a function of a selected window width for the selected at least one slice using an image processing procedure based on the transfer function.

2. The method as claimed in claim 1, wherein, in the image processing procedure, the window width is coupled to at least one parameter of a three-dimensional convolution core, with the aid of which the primary data record is reconvolved, and wherein the at least one selected slice is modified with regard to the image sharpness.

3. The method as claimed in claim 1, wherein, in the image processing procedure, the window width is coupled to at least one parameter of a two-dimensional convolution core, with the aid of which the at least one slice is convolved and modified with regard to the image sharpness.

4. The method as claimed in claim 1, wherein the primary data record is reconstructed with the aid of a convolution core of maximum sharpness and a slice sensitivity profile of maximum narrowness.

5. The method as claimed in claim 1, wherein the at least one slice is an axial slice.

6. The method as claimed in claims 1, wherein the at least one slice is a secondary slice.

7. The method as claimed in claim 1, wherein the selection of the window width is performed by a user.

8. The method as claimed in claim 1, wherein the transfer function additionally constitutes a functional relationship between window width and slice sensitivity profile.

9. A method for retrospective filtering of CT images, comprising:

reconstructing a primary data record from a from a CT raw data record;

reconstructing an image stack with the aid of a corresponding image characteristic on the basis of the primary data record;

calculating a changed image characteristic of the image stack; and visualizing the image stack in the form of CT images with the aid of the changed image characteristic.

10. The method as claimed in claim 9, wherein at least one parameter of the three-dimensional primary data convolution core is varied, the primary data record is then reconvolved in the image processing procedure using varied parameter, and a new image stack is determined from the reconvolved primary record that is modified with regard to image sharpness.

11. The method as claimed in claims 9, wherein at least one parameter of a two-dimensional convolution core is varied, the varied at least one parameter is then used in the image processing procedure for the individual convolution of individual slices of the image stack and to modify them with regard to their image sharpness.

12. The method as claimed in claims 9, wherein the steps of calculating and visualizing are repeatable until a satisfactory image characteristic is achieved.

13. The method as claimed in claim 9, wherein the image stack constitutes a stack of axial images.

14. The method as claimed in claims 9, wherein the image stack constitutes a stack of arbitrary secondary sections.

15. The method as claimed in claim 9, wherein slice thickness of a slice contained in the image stack is also varied in the event of an unsatisfactory image characteristic.

16. A computed tomography unit for carrying out the method as claimed in claim 1, comprising a computing device.

17. A computer software product adapted to cause a computing device connected to a computed tomography unit to implement the method as claimed in claim 1.

18. The method as claimed in claim 1, further comprising:

acquiring the CT raw data record with the aid of at least one of a CT unit and a C-arm unit.

19. The method as claimed in claim 1, wherein the primary data record is reconstructed from the CT raw data record using at least one of a sharp convolution core and a narrow slice sensitivity profile.

20. The method as claimed in claim 18, wherein the primary data record is reconstructed from the CT raw data record using at least one of a sharp convolution core and a narrow slice sensitivity profile.

21. The method as claimed in claim 2, wherein the at least one slice is an axial slice.

22. The method as claimed in claim 2, wherein the at least one slice is a secondary slice.

23. The method as claimed in claim 3, wherein the at least one slice is an axial slice.

24. The method as claimed in claim 3, wherein the at least one slice is a secondary slice.

25. The method as claimed in claim 4, wherein the at least one slice is an axial slice.

26. The method as claimed in claim 4, wherein the at least one slice is a secondary slice.

27. The method as claimed in claim 1, wherein the selection of the window width is performed by a user using at least one of a mouse and keyboard.

28. The method as claimed in claim 9, further comprising:

acquiring the CT raw data record with the aid of at least one of a CT unit and a C-arm unit.

29. The method as claimed in claim 9, wherein the primary data record is reconstructed from the CT raw data record using at least one of a sharp convolution core and a narrow slice sensitivity profile.

30. The method as claimed in claim 28, wherein the primary data record is reconstructed from the CT raw data record using at least one of a sharp convolution core and a narrow slice sensitivity profile.

31. The method as claimed in claim 9, wherein a changed image characteristic of the image stack is calculated by an image processing procedure running in the background on the image computer.

32. The method as claimed in claim 30, wherein a changed image characteristic of the image stack is calculated by an image processing procedure running in the background on an image computer.

33. The method as claimed in claim 9, wherein, via an interface, at least one parameter of the three-dimensional primary data convolution core is varied by a user, the primary data record is then reconvolved in the image processing procedure using varied parameter, and a new image stack is determined from the reconvolved primary record that is modified with regard to image sharpness.

34. The method as claimed in claim 10, wherein the steps of calculating and visualizing are repeatable until a satisfactory image characteristic is achieved.

35. The method as claimed in claim 10, wherein the image stack constitutes a stack of axial images.

36. The method as claimed in claim 10, wherein the image stack constitutes a stack of arbitrary secondary sections.

37. The method as claimed in claim 11, wherein the steps of calculating and visualizing are repeatable until a satisfactory image characteristic is achieved.

38. The method as claimed in claim 11, wherein the image stack constitutes a stack of axial images.

39. The method as claimed in claim 11, wherein the image stack constitutes a stack of arbitrary secondary sections.

40. A computed tomography unit for carrying out the method as claimed in claim 9, comprising a computing device.

41. A computer software product adapted to cause a computing device connected to a computed tomography unit to implement the method as claimed in claim 9.

42. A computed tomography unit for carrying out the method as claimed in claim 20, comprising a computing device.

43. A computer software product adapted to cause a computing device connected to a computed tomography unit to implement the method as claimed in claim 20.

44. A computed tomography unit for carrying out the method as claimed in claim 32, comprising a computing device.

45. A computer software product adapted to cause a computing device connected to a computed tomography unit to implement the method as claimed in claim 32.

* * * * *